United States Patent [19]

Roberts

[11] 4,354,781
[45] Oct. 19, 1982

[54] DOUBLE DECK SECURING MEANS FOR RAILROAD CAR

[76] Inventor: Hugh Roberts, 814 Marlowe Rd., Cherry Hill, N.J. 08003

[21] Appl. No.: 118,729

[22] Filed: Feb. 5, 1980

[51] Int. Cl.³ .............................................. B61D 45/00
[52] U.S. Cl. ...................................... 410/77; 410/68; 410/80; 410/81
[58] Field of Search ..................................... 410/68–81

[56] References Cited
U.S. PATENT DOCUMENTS

| | | |
|---|---|---|
| 3,083,670 | 4/1963 | Harlander et al. ..................... 410/81 |
| 3,374,030 | 3/1968 | Brisebois ................................ 410/80 |
| 3,486,787 | 12/1969 | Campbell ............................. 410/80 |
| 3,823,674 | 7/1974 | Dupre .................................... 410/68 |
| 3,856,247 | 12/1974 | Keighley ............................... 410/77 |
| 4,061,391 | 12/1977 | Violette ................................ 410/68 |
| 4,163,425 | 8/1979 | Bedard .................................. 410/77 |

*Primary Examiner*—Richard A. Bertsch

[57] ABSTRACT

Disclosed herein is an improved railroad flatcar having means for securing shipping containers in a double deck configuration comprising a frame assembly with vertical members having retractable and extendable bullet-shaped or cylindrical securing members.

13 Claims, 4 Drawing Figures

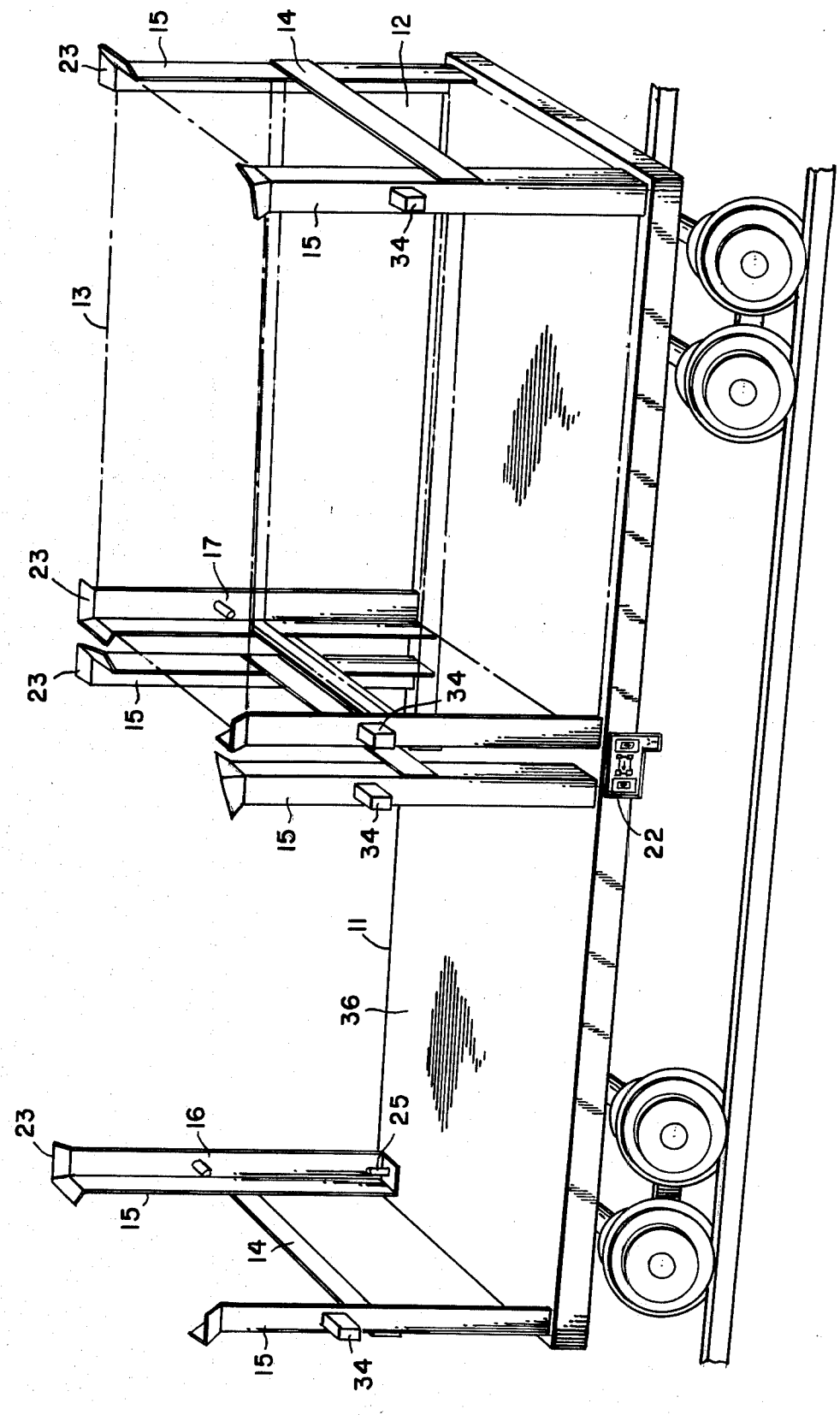

DOUBLE DECK SECURING MEANS FOR RAILROAD CAR

BACKGROUND OF THE INVENTION

1. Field of the Invention

This invention relates to railroad flatcars used for containerized shipping.

2. Description of the Prior Art

In a conventional railroad flatcar used in containerized shipping, standardized, standard sized shipping containers are loaded onto and off of flatcars with cranes without any special system to secure the containers to the flatcars. The containers are only on one level.

Due to potential weight and energy savings, and also due to the shortage of railroad flatcars, it has long been desired to devise a system for carrying the containers in a double deck configuration on railroad flatcars, but for safety and other considerations such a system is not a simple matter.

For example, reference is made to an article in *Journal of Commerce*, June 25, 1979, page 7A, wherein one double-deck design is described. The system described therein appears to involve simply stacking two containers without means to secure the containers on the flatcar. In the event of a derailment or other accident, the top container would most likely fall off.

No prior art railway containerized shipping system is known which allows double-deck container stacking with adequate safety and efficiency.

SUMMARY OF THE INVENTION

It is an object of the present invention to provide means for securing shipping containers in a double deck configuration.

It is a further object of this invention to provide a safe double-deck containerized shipping system and apparatus.

These objects, and others as will become apparent from the following disclosure, are achieved by the present invention which comprises means for securing containers in a double-deck configuration, said shipping containers having corner castings which have side holes, comprising a frame assembly, said frame assembly having four "L" shaped vertical members, at least two of said vertical members having retractable and extendable bullet-shaped or cylindrical securing members aligned with the side holes of the upper shipping container.

BRIEF DESCRIPTION OF THE DRAWINGS

FIG. 1 is a perspective view of a frame assembly on a flatbed railway car;

DETAILED DESCRIPTION OF THE INVENTION AND THE PREFERRED EMBODIMENTS

Figure 3:
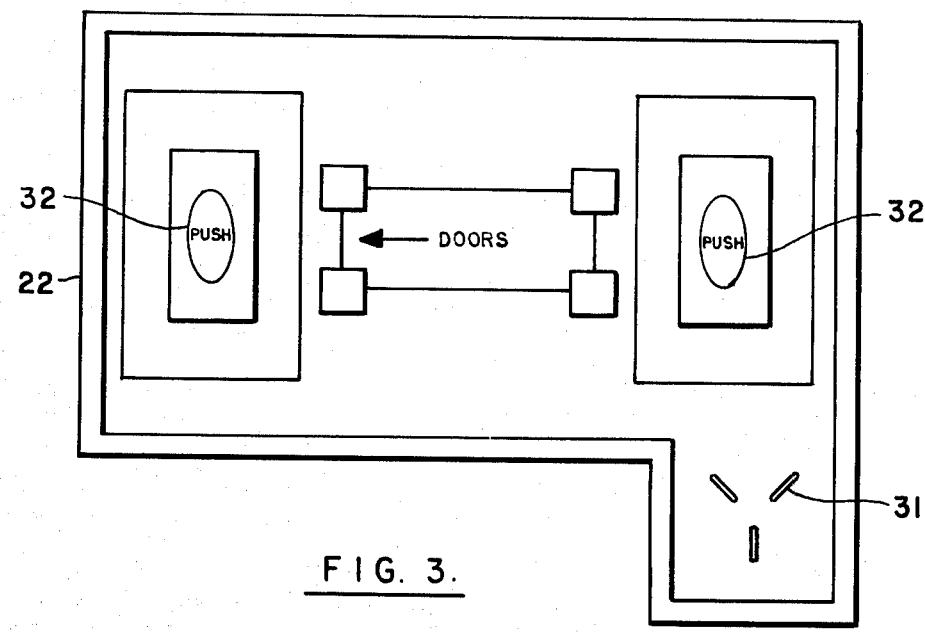
FIG. 3 is a plan view of a control panel for use in the invention.

Referring first to FIG. 1, railroad flatcar 11 has attached frame assembly 14 comprised of L-shaped members 15, at least two of which having bullet-shaped retractable and extendable securing members 16, said securing members being positioned on said vertical members 15 so as to be aligned with the side holes 19 of the corner castings (FIG. 4) of the upper shipping container 13 and adapted to extend into the side holes 19 prior to the movement of the flatcar. Instead of bullet-shaped securing members as shown at 16, the securing member can alternatively be cylindrical as shown at 17. The vertical members 15 can be steel, plastic, or combinations thereof.

Figure 4:
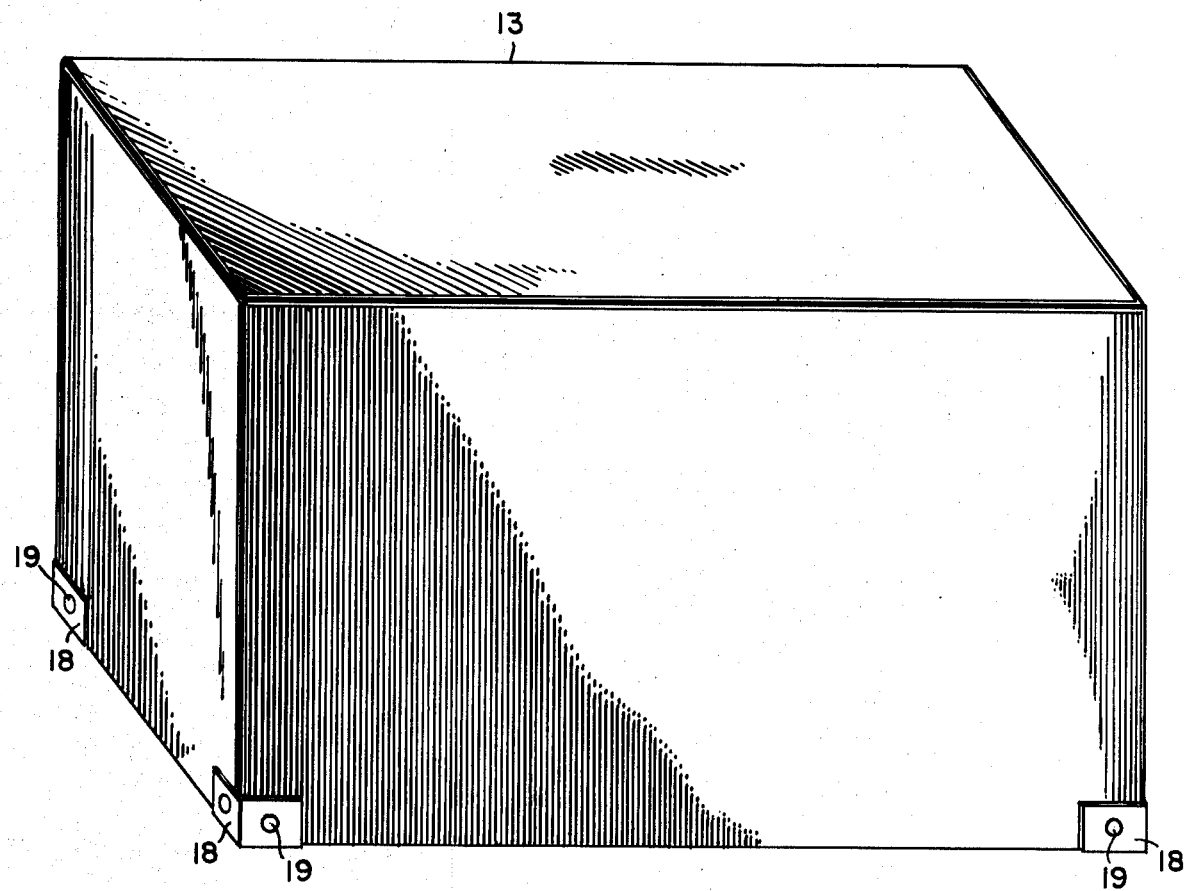
FIG. 4 is a perspective view of a shipping container showing the corner castings.

Standardized shipping containers, illustrated in FIG. 4, already in wide use in combined truck, train and ship shipping, have corner castings 18 which are adapted for securing to trailer trucks. These containers are also used on railroad cars and ships, but no use is made of the corner casting holes in such applications. The present invention takes advantage of these corner castings in securing double deck containerized railroad shipments.

In accordance with the present invention, it is preferred to secure only the upper container 13, although it is also possible to secure the lower container 14 in addition, but additional securing members would be needed at the bottom of the L-shaped members 15.

The vertical L-shaped members 15 preferably have receiving flanges 23 at the top, adapted to guide and align the shipping containers during loading.

Figure 2:
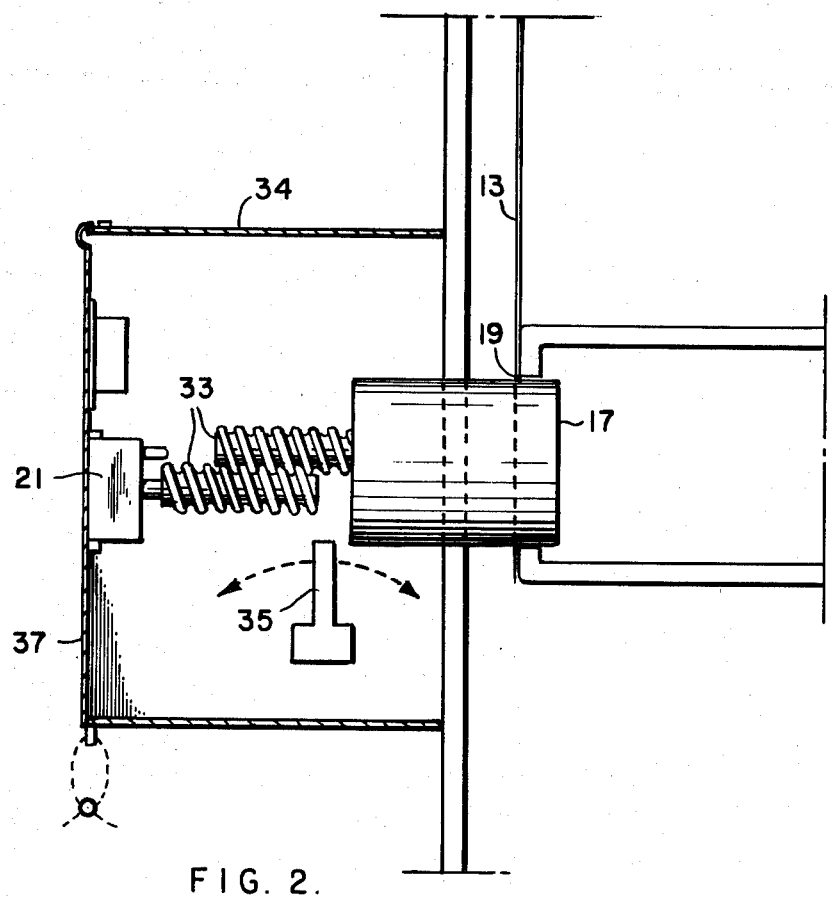
FIG. 2 is a cross-sectional view of a securing member and a motor drive therefor.

The securing members 16 or 17 can be manually extended, retracted and extended by simple mechanical or hydraulic means, or by means of electrical motors 21 (FIG. 2). A preferred method is by hydraulic means which requires fluid operated switches and tubulal connections between the switches and the securing members containing the hydraulic fluid. An advantage to hydraulic control of the securing members is that such means of control is more dependable and does not require an electrical source.

It is also preferable to include electrical signal means 22 (FIGS. 1 and 3) to signify the extended or retracted status of each of the securing members, and push buttons 32 to operate the motors. In the illustrated embodiment, electrical motors are shown connected to said securing members by means of worm gears 33. A contact switch 35 is shown which turns off the motor when the securing member is fully retracted. The control panel 22 contains a plug 31 which fits into a power socket to be provided at a loading or unloading location along the railroad. A lockable door can be provided on said control panel (not shown) to prevent accidental or unauthorized changes in the extended status of the securing members 16.

The floor of the flatcar can be provided with at least one, preferably four, bullet-shaped fixed, i.e., not extendable, securing alignment members 25 adapted to guide and align the lower shipping container 12 during loading so as to further facilitate quick and efficient loading of the shipping containers.

The motor is contained in a housing 34 which has access door 37.

By using the invention herein described and disclosed in complete detail, it is possible to ship twice as many containers in a given length of train, with substantial weight savings as compared with prior art railroad shipping systems.

Although a few embodiments of the invention have been described in detail, various alternatives and modifications should become readily apparent without departing from the spirit and scope of the invention.

I claim:

1. In a railroad flatcar, means for securing shipping containers in a doubledeck configuration, said shipping containers having corner castings with side holes and bottom holes, the improvement comprising a frame assembly, said frame assembly having four L-shaped vertical members, at least two of said vertical members having retractable and extendable substantially cylindrical securing members, said securing members positioned on said vertical members so as to be aligned with the side holes of the corner castings of the upper shipping container and adapted to extend into the side holes of said upper shipping container corner casting prior to and during movement of said flatcar so as to secure the upper shipping container during movement of said flatcar, and to retract for unloading and reloading shipping containers on said flatcar so as to permit quick and efficient unloading and loading.

2. Railroad flatcar in accordance with claim 1 wherein said securing members are extended and retracted by means of electrical motors.

3. Railroad flatcar in accordance with claim 2 further including electrical signal means to signify the extended or retracted status of each of said securing members.

4. Railroad flatcar in accordance with claim 2 wherein said electrical motors are connected to said securing members by means of worm gears.

5. Railroad car in accordance with claim 1 wherein said vertical members are steel.

6. Railroad flatcar in accordance with claim 1 wherein said vertical members have receiving flanges at the top adapted to guide and align the shipping containers during loading so as to further facilitate quick and efficient loading of said containers.

7. Railroad flatcar in accordance with claim 1 wherein said securing members are extended and retracted by means of electrical motors, said vertical members are steel, plastic, or a combination thereof, said vertical members have receiving flanges at the top, and said flatcar includes electrical signal means to signify the extended or retracted status of each of said securing members.

8. Railroad flatcar in accordance with claim 1 further including means to prevent accidental or unauthorized changes in the extended status of said securing members.

9. Railroad flatcar in accordance with claim 1 further including at least one bullet shaped fixed alignment member extending upwardly from the floor of said flatcar and aligned so as to engage a hole at the bottom of the corner casting of the lower shipping container.

10. Railroad flatcar in accordance with claim 9 further including a contact switch adapted to turn off the electrical motor when the securing member is fully retracted.

11. Railroad flatcar in accordance with claim 1 wherein said securing members are hydraulically extended and retracted.

12. Railroad car in accordance with claim 1 wherein said vertical members are plastic.

13. Railroad car in accordance with claim 1 wherein said vertical members are a combination of steel and plastic.

* * * * *